(12) United States Patent
Kloft et al.

(10) Patent No.: US 9,945,394 B2
(45) Date of Patent: Apr. 17, 2018

(54) SEPARATING DEVICE FOR FLUID MEDIA

(71) Applicant: Hydac Technology GmbH, Sulzbach/Saar (DE)

(72) Inventors: Peter Kloft, Ransbach-Baumbach (DE); Herbert Baltes, Losheim (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 401 days.

(21) Appl. No.: 14/433,400

(22) PCT Filed: Sep. 7, 2013

(86) PCT No.: PCT/EP2013/002692
§ 371 (c)(1),
(2) Date: May 28, 2015

(87) PCT Pub. No.: WO2014/063766
PCT Pub. Date: May 1, 2014

(65) Prior Publication Data
US 2015/0322971 A1  Nov. 12, 2015

(30) Foreign Application Priority Data
Oct. 26, 2012 (DE) ......................... 10 2012 021 841

(51) Int. Cl.
| | |
|---|---|
| *F16J 1/04* | (2006.01) |
| *F15B 1/24* | (2006.01) |
| *F16J 1/00* | (2006.01) |
| *F15B 15/14* | (2006.01) |

(52) U.S. Cl.
CPC ............ *F15B 1/24* (2013.01); *F15B 15/1447* (2013.01); *F16J 1/008* (2013.01); *F15B 2201/31* (2013.01)

(58) Field of Classification Search
CPC .... F15B 1/24; F15B 15/1447; F15B 2201/31; F16J 1/008; F16J 1/04
USPC ....................................... 92/172, 208; 138/31
See application file for complete search history.

(56) References Cited

U.S. PATENT DOCUMENTS

| | | | |
|---|---|---|---|
| 2,742,929 A | 4/1956 | Treseder | |
| 6,539,976 B1 | 4/2003 | Whiteside | |
| 2002/0020290 A1* | 2/2002 | Reul | F15B 15/1447 92/248 |
| 2011/0308383 A1* | 12/2011 | Hillesheim | F15B 1/24 92/248 |

(Continued)

FOREIGN PATENT DOCUMENTS

| | | |
|---|---|---|
| DE | 1 026 143 B | 3/1958 |
| DE | 1 625 965 A1 | 8/1970 |

(Continued)

*Primary Examiner* — F. Daniel Lopez
*Assistant Examiner* — Daniel Collins
(74) *Attorney, Agent, or Firm* — Wenderoth, Lind & Ponack, L.L.P.

(57) ABSTRACT

A separating device for fluid media receivable in a working housing (1). A separating piston (3) is inside the working housing (1) and separates two media compartments (5, 7) from one another in a media-tight manner. The separating piston (3) is provided along its external circumference with a guide (19). During a transversing movement of the separating piston (3) inside the working housing (1), the guide bears slidably on the housing inner wall (21) and is an integral component of the separating piston (3).

15 Claims, 9 Drawing Sheets

(56) References Cited

U.S. PATENT DOCUMENTS

2013/0074967 A1* 3/2013 Marin ................. F15B 1/04
                                                         138/31

FOREIGN PATENT DOCUMENTS

| DE | 103 52 697 A1 | 6/2005 |
|---|---|---|
| DE | 10 2004 033 502 A1 | 2/2006 |
| GB | 759106 | 10/1956 |
| WO | WO2005/065848 A1 | 7/2005 |

* cited by examiner

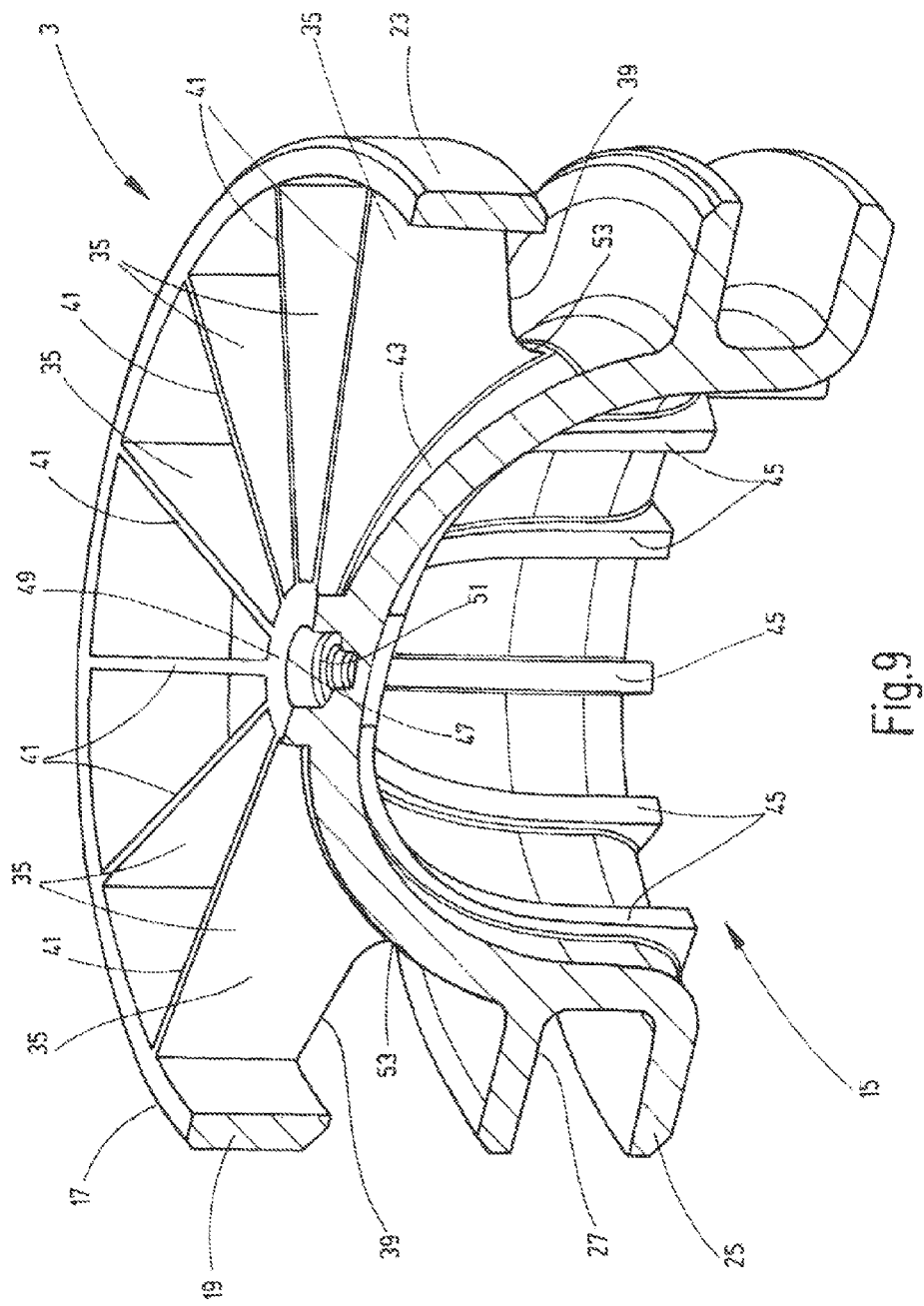

SEPARATING DEVICE FOR FLUID MEDIA

FIELD OF THE INVENTION

The invention relates to a separating device for fluid media, which can be received in a working housing, having a separating piston. The separating piston separates two media chambers from one another in a media-tight manner within the working housing and is provided along the outer circumference thereof at least partially with a guiding device. During a traversing movement of the separating piston within the working housing, the guiding device rests slidingly against the inner wall of the working housing. In addition, the invention relates to a piston/cylinder assembly having this separating device.

BACKGROUND OF THE INVENTION

Separating devices of the above-mentioned generic kind are used in a wide variety of application areas and in conjunction with a wide array of media and in working housings of all different types of designs and uses. Depending on the area of application, liquid, gaseous or conditionally flowable media, such as pasty substances, may be enclosed in the appropriate media chambers. Accordingly, the respective separating piston may have the task of separating gaseous media from fluid media, gaseous media from gaseous media, fluid media from fluid media, or one of the above-mentioned types of media from a pasty media, or of separating pasty media from one another. Other significant areas of application for separating devices of the above-mentioned generic type are piston/cylinder assemblies such as pump devices, working cylinders or piston accumulators. When the separating piston is intended to serve as a pump piston or working piston for pump devices or working cylinders, the separating piston must be coupled with a power transmitting device, for example in the form of a piston rod. In the case of a piston accumulator, the separating piston can be displaced as a free piston in the respective accumulator housing, and separates a gas side from an oil side in this housing, for example.

In view of the wide variety of applications for such separating devices, of which only a portion of are addressed merely by way of example, this results in large production quantities when manufacturing such separating devices. For economic reasons, a demand then exists for the efficient and cost-effective production of the separating devices.

SUMMARY OF THE INVENTION

In view of this problem, an object of the invention is to provide an improved separating device that can be produced in a simple and cost-effective manner, but that nevertheless is distinguished by an advantageous and reliable operating performance.

This object is basically achieved according to the invention by a separating device having, as a specific characteristic of the invention, a guide that is an integral component of the separating piston. Due to the fact that to this extent, the piston itself must assume the guiding function for the traversing movements within the working housing with its own material. The devices that are provided in the prior art cease to be used, such as conventional guide bands or guide rails, which can be received in groove-shaped recesses that are formed along the outer circumference of the respective separating pistons. The invention not only leads to a reduction in material costs, but it also avoids the assembly costs of mounting the guide bands and rails so that, in particular, lower manufacturing costs can be achieved.

For particularly simple and efficient production, the arrangement may be such that the guide has a guide ring, which is formed directly on the separating piston.

In the case of particularly advantageous exemplary embodiments, the guide ring is formed on an end region of the separating piston.

In the case of such an embodiment, particularly favorable guiding and sealing properties of the separating piston are achieved when a circumferential annular groove is formed on the end region of the separating piston that is located opposite the guide ring as a seat for a piston seal, for example, in the form of an O-ring. As a result of the axial spacing between the guide ring and the piston seal so formed, the separating piston is made particularly tilt-proof and is guided with an effective seal along the inner wall of the working housing.

The guide ring may form a part of a guide surface that forms a cylinder jacket to interact with a circular cylindrical inner wall of the working housing, so that a sliding surface is formed over an axial region of the piston.

In the case of particularly advantageous exemplary embodiments, the separating piston has a piston head, which forms the partition wall between the chambers of the working housing. The piston head has a curvature into the inside of the piston, which curvature forms a part of a spherical surface. A domed structure not only contributes to an increase in strength, but also permits increasing the volume of the media chamber that is adjacent to the piston head of the separating piston.

In an particularly advantageous manner, this arrangement may be such that the piston head of the separating piston forms a hemispheric-shaped dome that is open towards the piston side. The inside of that dome is provided with ribs, which extend along circles of longitude with reference to the equatorial plane defined by the opening of the hemispheric shape. The hemispheric shape of a dome having reinforcing inner ribs results both in the piston head having a high degree of structural stability, and in a comparatively large increase in the volume of the chamber that is adjacent to the piston head.

In the case of exemplary embodiments, in which an outer surface of the dome of the piston head formed in the region of the center of the sphere extends to the height of the adjacent end region of the separating piston, a particular advantage is achieved by the fact that the stiff dome structure of the piston head can serve as a bearing surface. With the bearing surface, the separating piston can be supported on the end cap in the case of a traversing movement to an end cap of a respective working housing.

In the case of particularly advantageous exemplary embodiments, the separating piston is has reinforcement ribs in the form of plates, which extend such that they are uniformly spaced apart from one another in the shape of a star in a radial direction. The plates form the connection between the guide ring of the separating piston and the piston head thereof. As a result, the separating piston has an open design with a cavity, in which a high degree of strength is achieved with a minimum use of materials. In addition to the advantage of minimum material usage, the advantage of a low piston weight with a correspondingly low mass inertia of the piston during the traversing movements is also achieved. This structure is advantageous, not only when using the separating piston in the case of a piston/cylinder assembly in the form of power cylinders, pump cylinders or the like, but in particular, when using the separating piston as a free piston in the case of accumulator pistons, in which a light weight piston allows for a good response behavior.

In the case of a design having reinforcement ribs as connecting elements between the guide ring and the piston head of the separating piston, a closed piston skirt that extends between the guide ring and the piston head can be omitted in the interest of saving on weight and material. The radially external end edges of the reinforcement ribs may also extend in the axial region of the separating piston between the guide ring and the annular groove such that they are offset radially inward. As a result of this arrangement, the weight and material usage are further reduced. In so doing, the end edge may extend inward with a radial curve.

In the case of particularly advantageous exemplary embodiments, the reinforcement ribs are designed in such a way that the upper edges thereof lie in the same plane as the upper outer surface of the spheroidal dome of the piston head and as the end edge of the guide ring, which defines the end of the piston. This arrangement results in a significant increase in the contact surface, with which the separating piston comes to rest on a cover of a respective working housing, for example, a cylinder cover in the case of an accumulator piston.

The design having a piston head region that is reinforced by a hemispheric-shaped dome and having reinforcing ribs allows manufacturing a separating piston with a high degree of structural and form stability at minimal material costs. In particular, this design allows manufacturing of the separating piston out of a plastic material in an injection molding process in an especially efficient and economical manner.

The subject matter of the invention is also to provide a piston/cylinder assembly, which has a separating device according to this invention.

A piston/cylinder assembly of this kind may be advantageously designed, among other things, as an accumulator piston, in which the separating piston separates a gas side from an oil side.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIGS. 5 to 9 are enlarged perspective views in section of separating pistons according to third through seventh exemplary embodiments of the invention.

DETAILED DESCRIPTION OF THE INVENTION

Figure 1:
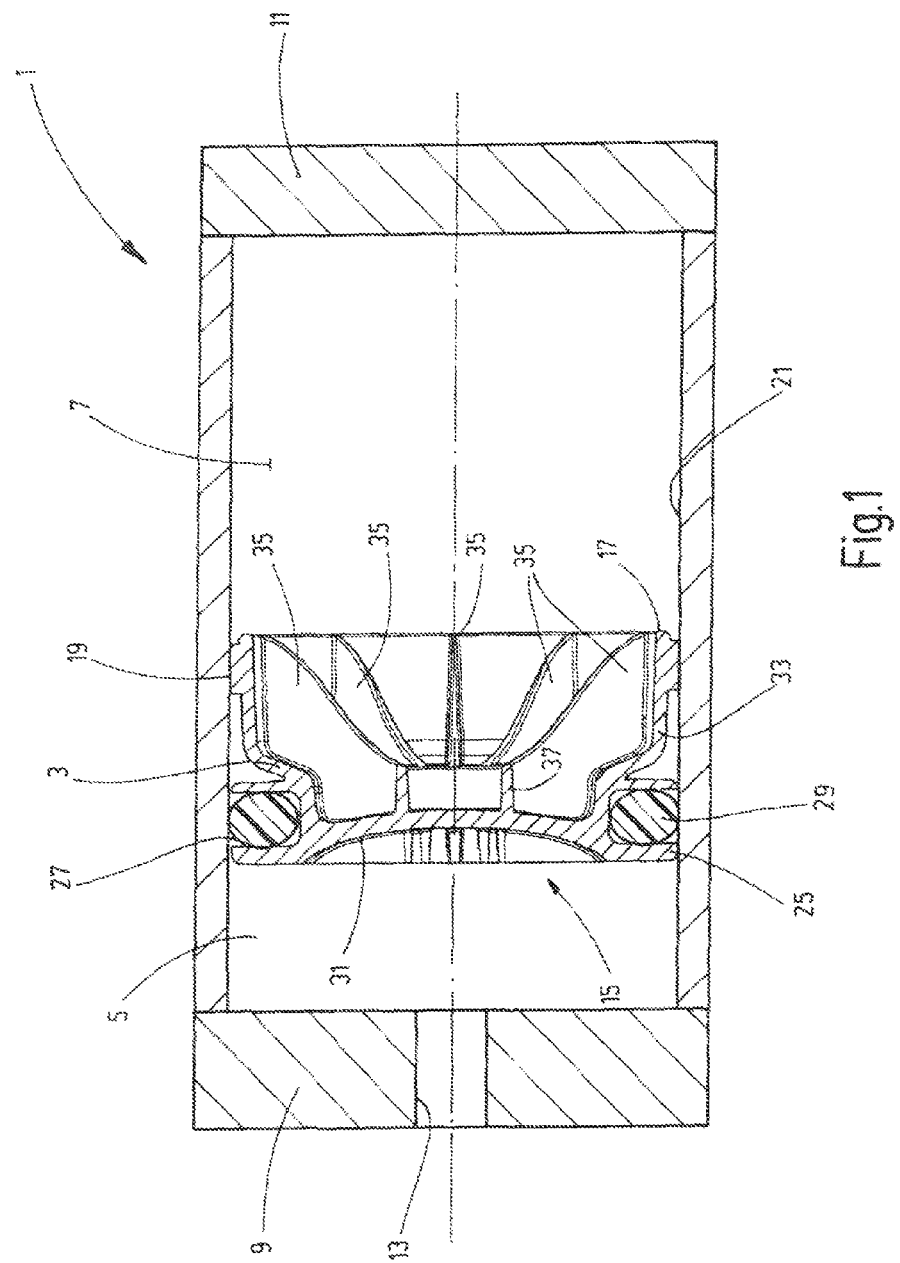
FIG. 1 is a side view in section of a schematically simplified accumulator piston, provided with a separating piston in accordance with an exemplary embodiment of the separating device according to the invention.

The separating device according to the invention is explained in the following description on the basis of an example of use, in which an axially displaceable separating piston 3 separates an oil side 5 from a gas side 7 in an accumulator housing 1. The circular cylindrical housing 1 is closed at the ends by two cover pieces 9, 11, of which, the cover piece 9 located on the left in FIG. 1 has an oil connection 13, permitting connection of the accumulator piston in a fluid-conveying or fluid communication manner to the pipework (not further depicted) of a hydraulic system and to the piston 3 to the oil side 5. The cover piece 11 located on the right in FIG. 1 may have a filling valve (not shown), by which the gas side 7 can be filled with a working gas, for example a nitrogen gas. The design of an accumulator piston, as thus noted, is prior art, so that a description in greater detail is not necessary.

Figure 2:
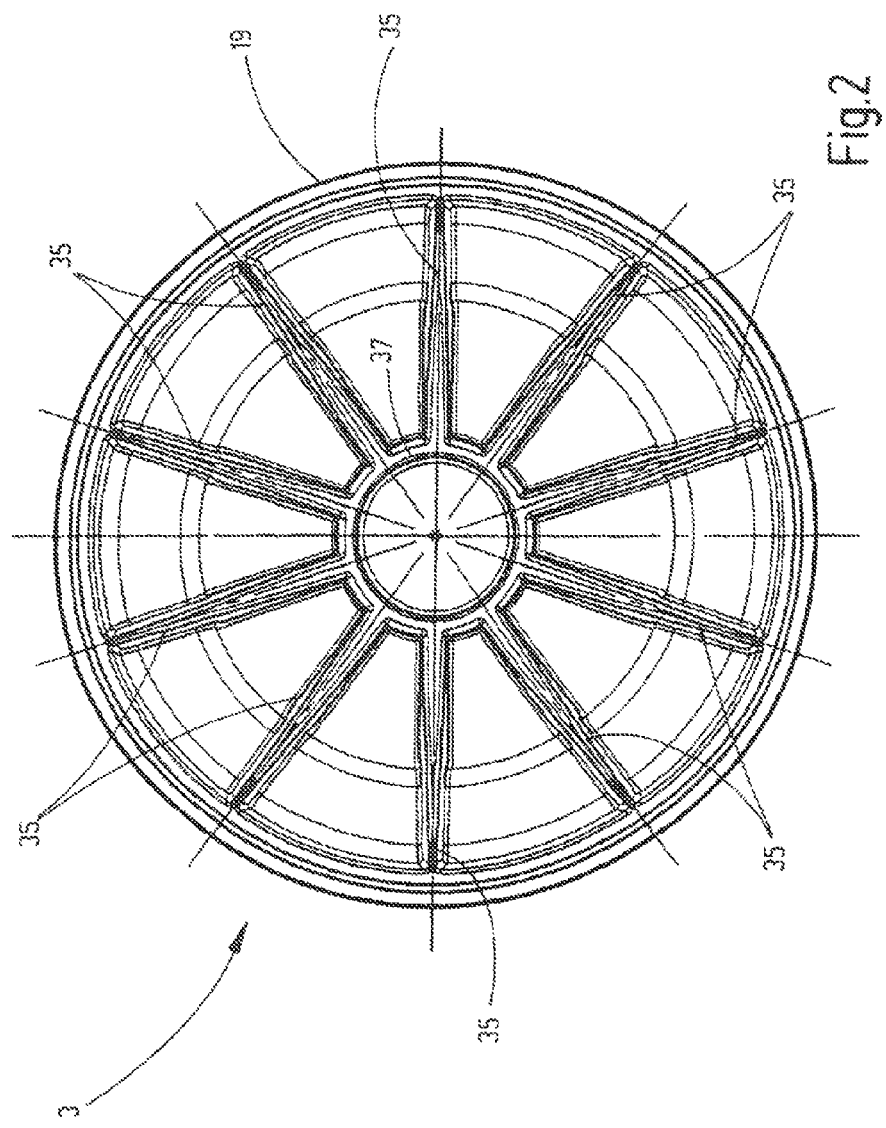
FIG. 2 is a top view of the separating piston from FIG. 1 that has been enlarged as compared to a practical embodiment.
Figure 3:
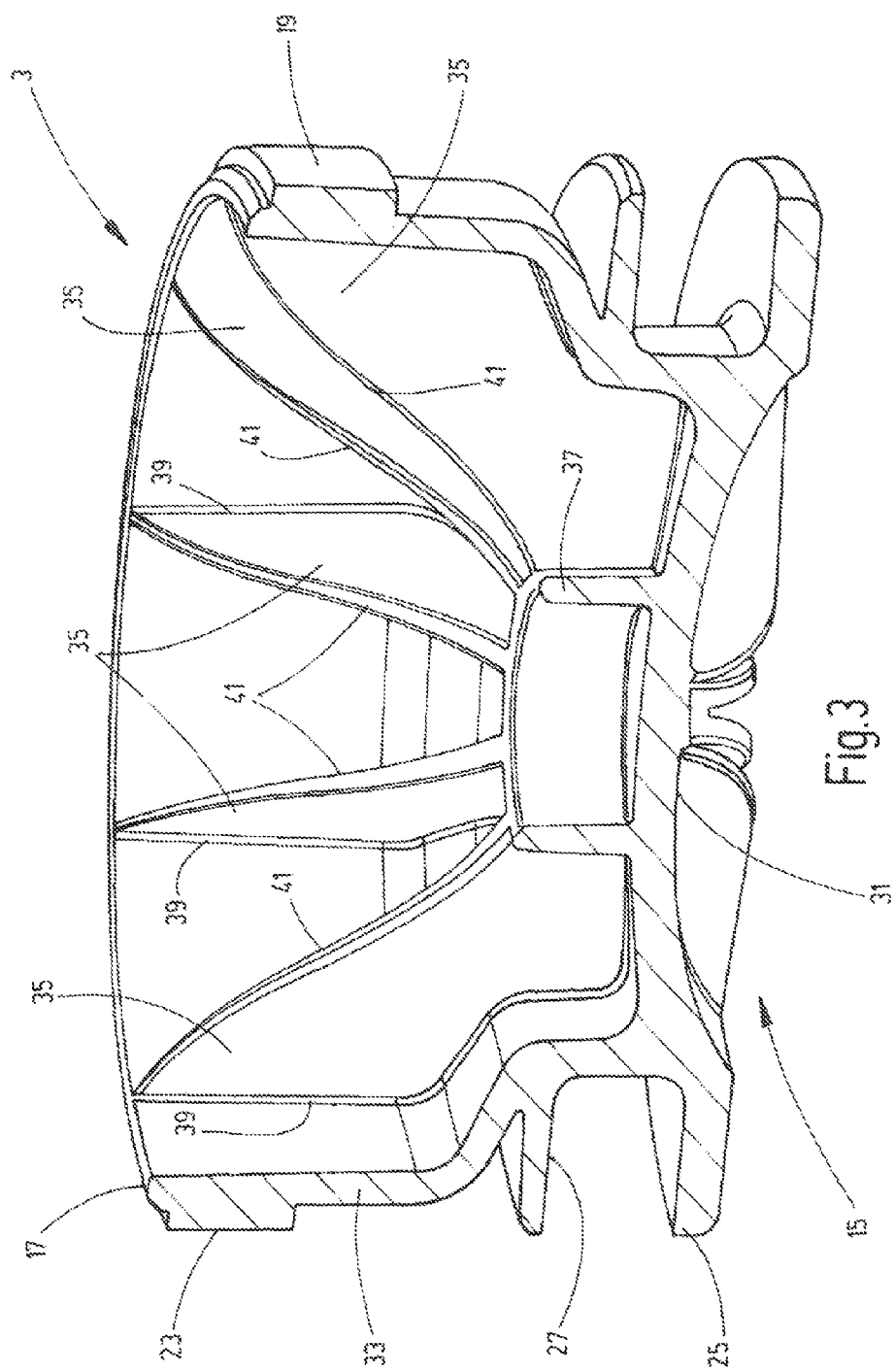
FIG. 3 is a further, enlarged perspective view in section of the separating piston of FIGS. 1 and 2.

As is shown in detail in FIG. 1 and in particular in FIGS. 2 and 3, in which the separating piston 3 is illustrated in detail, the separating piston 3 is designed to be of lightweight construction. A plurality of cavities are located between a piston head 15, which forms the partition wall, between the oil side 5 and has side 7, and end region 17 that is located opposite the piston head 15. In the region of this end region 17, a guide ring 19 is formed directly on the outer circumference of the separating piston 3 as an integral component of this separating piston 3. The guide ring 19, which is provided as a piston guide, forms a guide surface 23 in the form of a part of a cylinder jacket externally for interaction with the circular cylindrical inner wall 21 of the housing 1. The cylinder jacket extends from the end region 17 along part of the axial length of the separating piston 3, particularly along approximately ⅕ of the axial length of the separating piston 3. An annular groove 27 is adjoined along the circumference piston head 15 at the outer edge 25 thereof as a seat for a sealing element, which acts as a piston seal, such as an O-ring 29, which is only shown in FIG. 1. In a central region, the piston head 15 has a curvature 31 in the direction of the piston interior, which forms a part of a spherical surface. In the case of the exemplary embodiment in FIGS. 1 to 3, the separating piston 3 has a piston wall 33, which extends axially to the annular groove 27 from the guide ring 19 to the guide surface 23 thereof. That piston wall 33 is offset radially inward. Reinforcement ribs 35 in the form of flat plates, which extend in the shape of a star in a radial direction, form the connection between the guide ring 19, the piston wall 33 and the piston head 15. As can be most clearly seen in FIG. 3, the radially internal end edges of the reinforcement ribs 35 converge at a cylindrical mounting ring 37 in the central region of the curvature 31 of the piston head 15. The end edges 39 of the reinforcement ribs 35 abut the inside of the guide ring 19 and the piston wall 33. As can be seen most clearly in FIG. 3, radially extending end edges 41 of the reinforcement ribs 35 extend in a curved profile to the mounting ring 37, which is located lower down in an axial direction.

Figure 4:
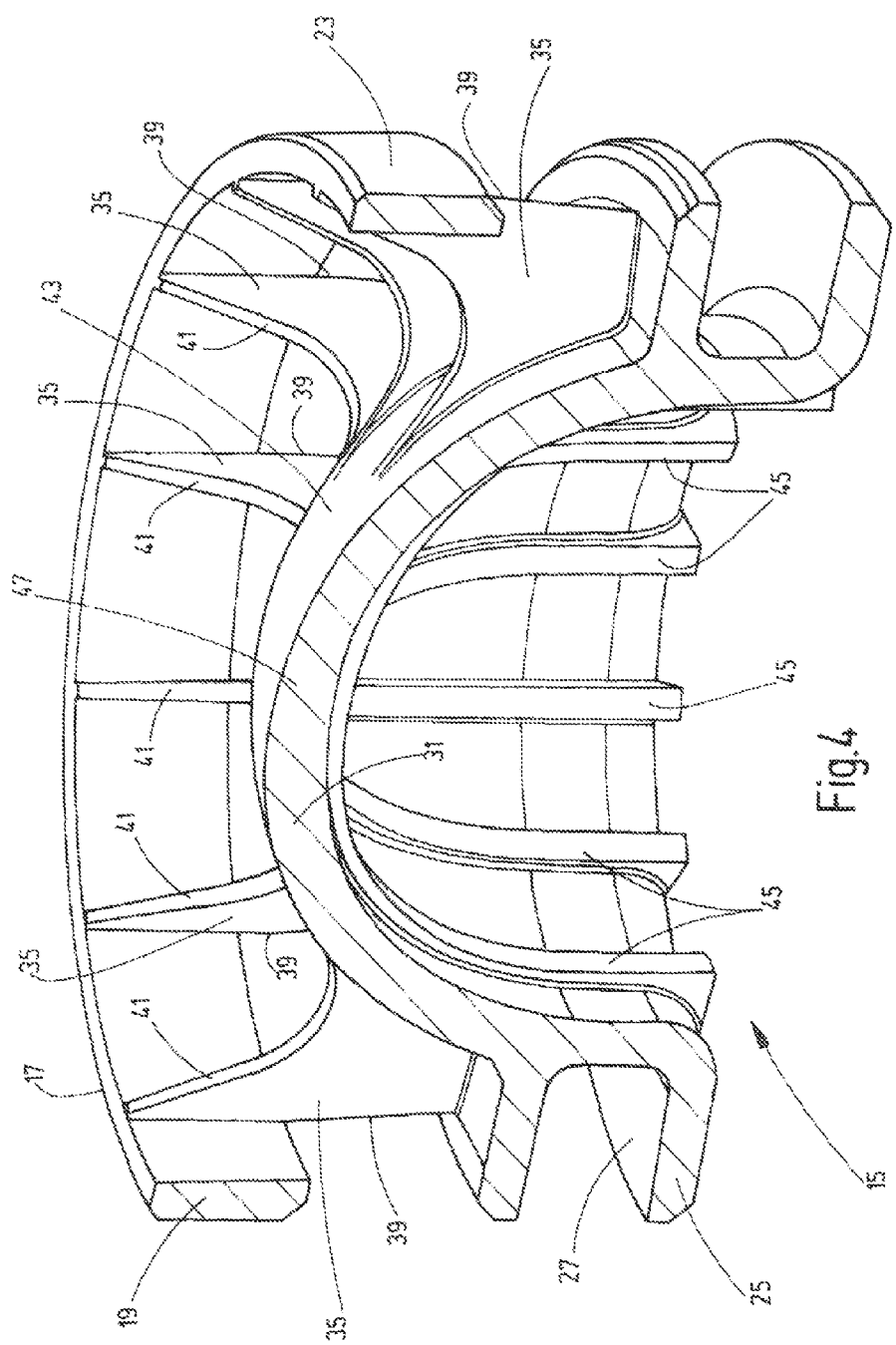
FIG. 4 is an enlarged perspective view in section of a separating piston according to a second exemplary embodiment of the invention.

The second exemplary embodiment, which is depicted in FIG. 4, differs from the example described above, among other things, by a piston head 15 that has a significantly more pronounced curve. Starting from the region of the outer edge 25 having the annular groove 27 located therein for the sealing element, which sealing element is not shown in FIG. 4, the central curvature 31 is formed in such a way that a hemispheric-shaped dome 43 is created in the interior of the separating piston 3. On the inside and outside of that dome, cavities are located. The dome 43 is reinforced on the inside by ribs 45, which project from the inner wall and which extend along regularly spaced circles of longitude in the direction of the center of the sphere 47 with reference to the equatorial plane defined by the opening of the hemispheric shape. A further difference from the first exemplary embodiment exists in the fact that the outer piston wall 33 is omitted between the guide ring 19 and the annular groove 27. Also, the radially external end edge 39 of the reinforcement ribs 35 is offset radially inwardly from the outer circumference of the separating piston 3.

Figure 5:
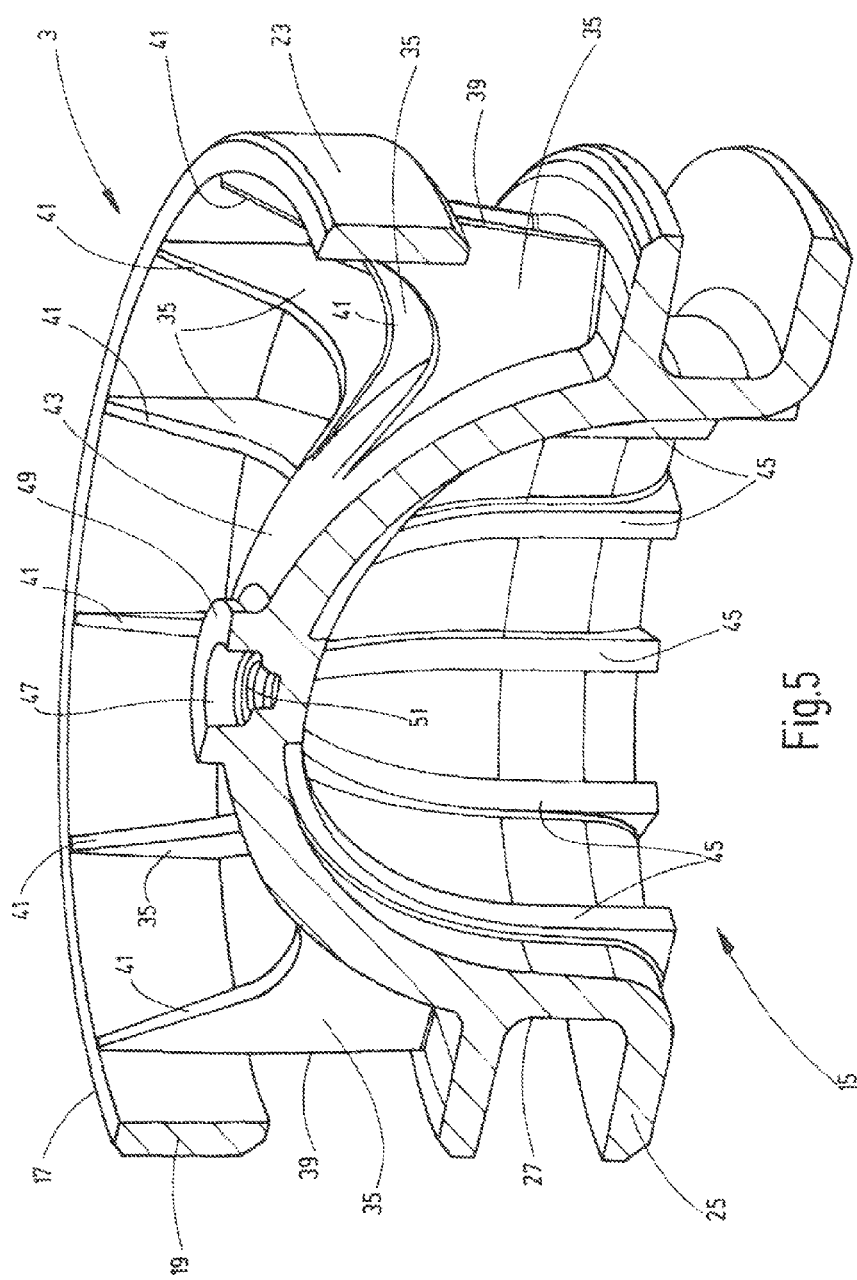

The third exemplary embodiment, which is shown in FIG. 5, corresponds to the exemplary embodiment from FIG. 4, with the exception of the fact that the center of the sphere 47 of the dome 43 is axially raised to the same plane as the end region 17. At the center of the sphere 47, an outer surface 49 is formed in such a way that a larger contact surface is formed for contact with a cover piece 9. This contact results in improved strength properties in the event that an overpressure would prevail on the oil side 5. A bore 51 formed on the outer surface 49 can serve as a connection device for a coupling element that may be provided, such as a piston rod.

Figure 6:
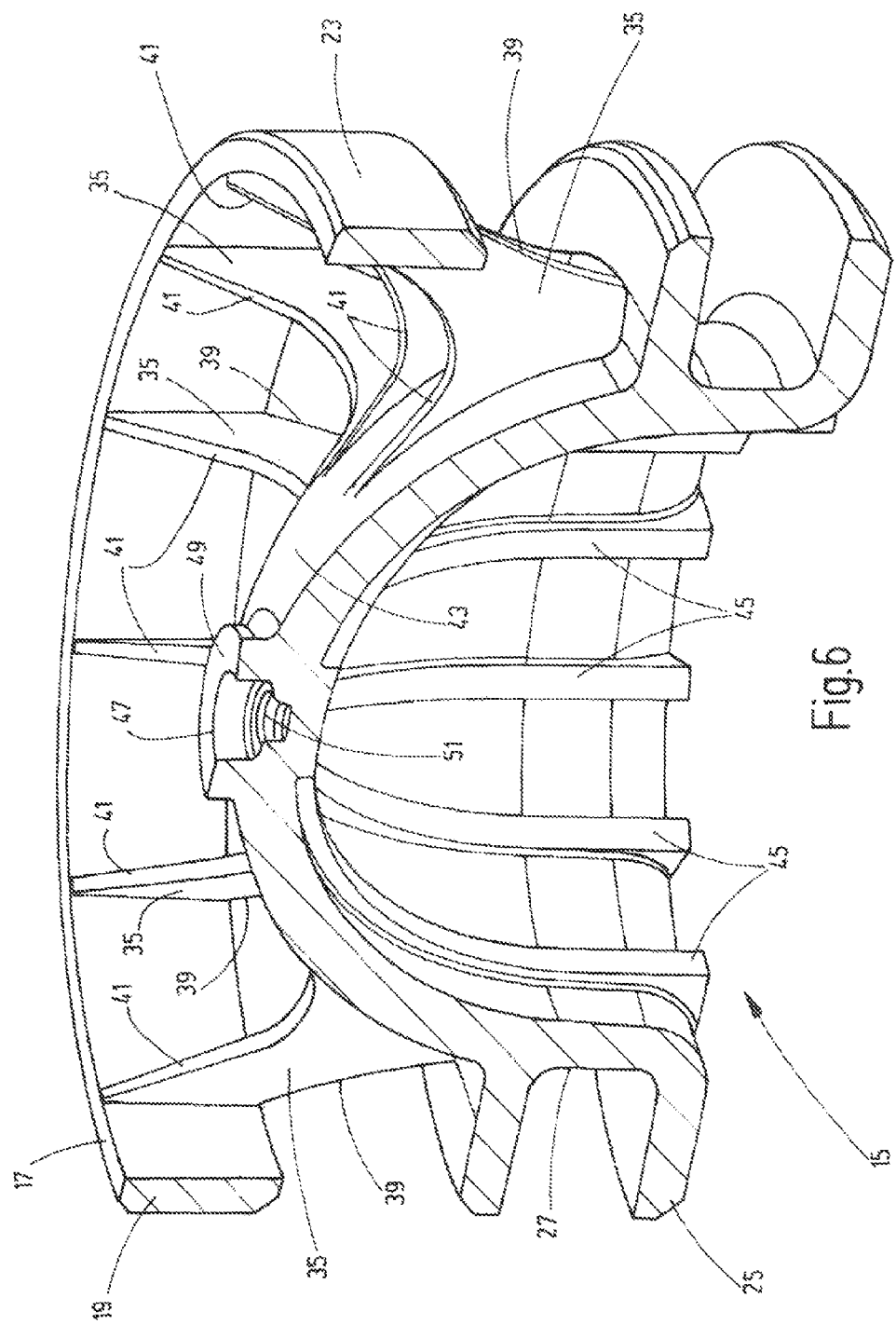

FIG. 6 shows a fourth exemplary embodiment, which differs from the embodiment shown in FIG. 5 only insofar as the outer edge 39 of the reinforcement ribs 35 between the guide ring 19 and the outside of the dome 43 do not extend in a straight line, but rather, curves radially inward.

Figure 7:
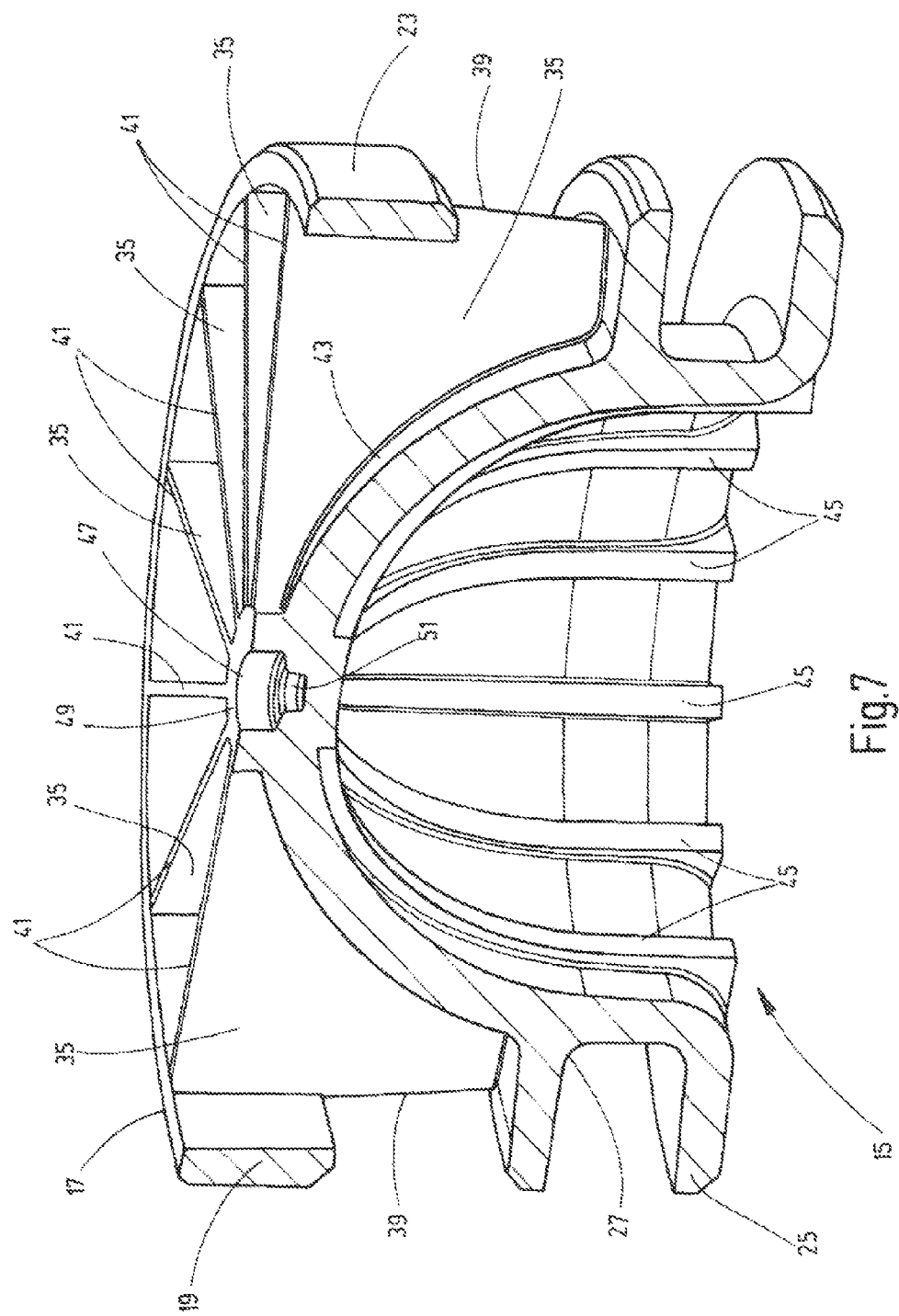

The fifth exemplary embodiment from FIG. 7 corresponds to the exemplary embodiment from FIG. 5, with the exception that the upper end edge 41 of the reinforcement ribs 35 extend in the same plane as the upper end region 17 of the separating piston 3 and the outer surface 49 of the center of the sphere 47 of the dome 43. Together with this outer surface 49, the end edges 41 of the reinforcement ribs 35 enlarge the contact surface for resting against a housing cover. As a result of which, especially favorable strength properties are achieved.

Figure 8:
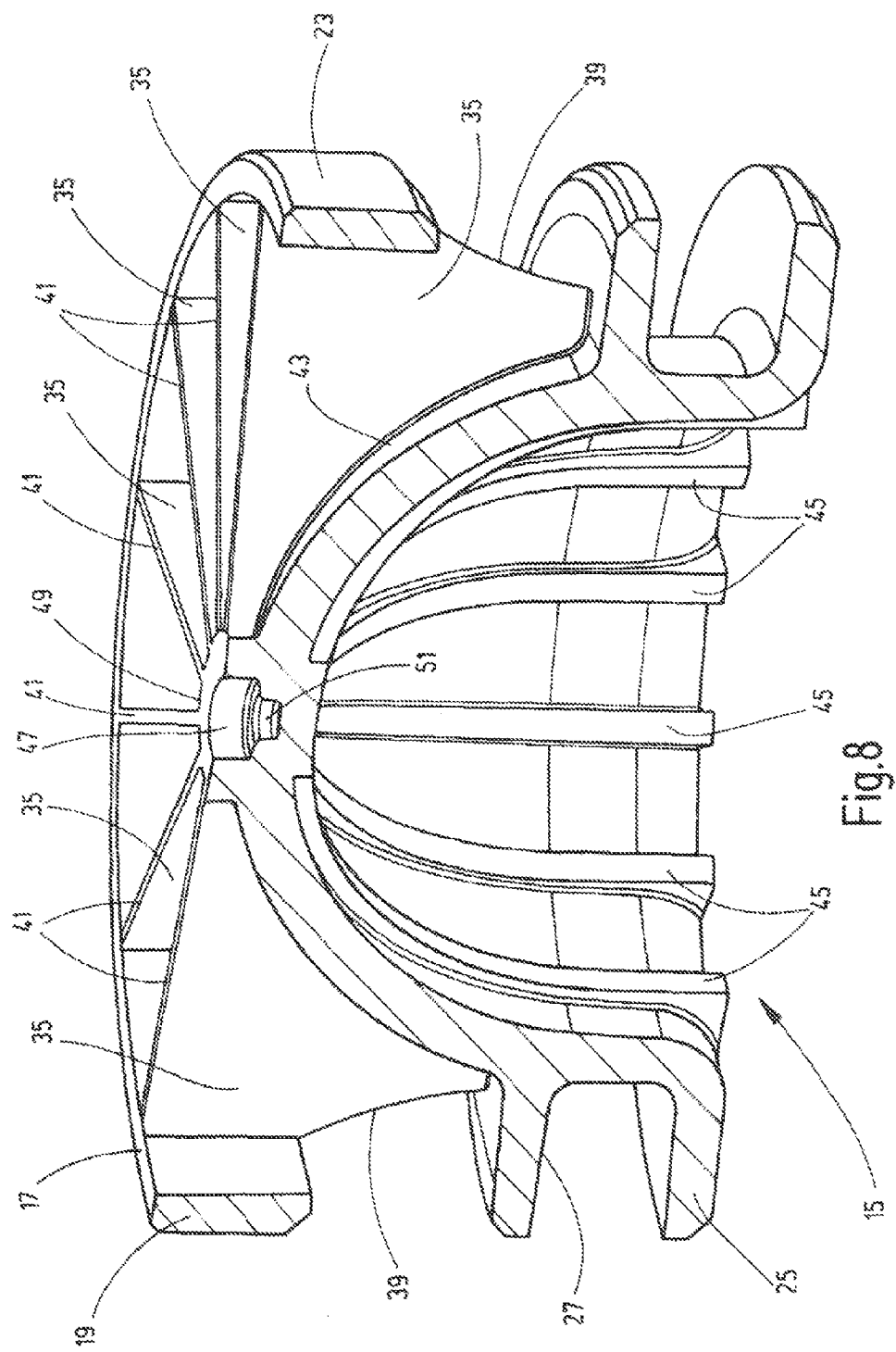

The sixth exemplary embodiment from FIG. 8 corresponds to the exemplary embodiment from FIG. 7, with the exception that, as is likewise the case in the example from FIG. 6, the radially external end edge 39 of the reinforcement ribs 35 extends between the guide ring 19 and the annular groove 27 such that those edges curve radially inward.

The seventh exemplary embodiment in FIG. 9 differs from the example in FIG. 8 in that the radially external end edges 39 of the reinforcement ribs 35, do not extend in an axial direction starting at the guide ring 19 to the annular groove 27. Rather, the end edges 39 are adjacent to the outside of the dome 43 in a region 53 that is axially offset from the annular groove 27. Thanks to the high degree of structural stability of the spherical dome 43, favorable strength properties of the separating piston 3 are achieved despite the additional saving on piston material and resultant further reduced piston weight.

The design of the separating piston 3 according to the invention permits the integral form the separating piston 3 from a plastic material such that it has a high degree of stability and a very low piston weight, for example using injection molding. For example, polyarylamide may be provided as a material, which essentially has the same thermal expansion coefficients as a steel material, which are suitable as a material for the working housing, for example, as an accumulator housing 1, in many application areas. Piston/cylinder assemblies having the separating device according to the invention can thereby be reliably operated over wide working or temperature ranges, for example over ranges of −40° C. to 120° C. or greater. A reinforcement of the plastic material may also be provided, such as glass fiber reinforcement and/or plastic fibers or a plastic ply, which can be applied in the manner of a laminate.

While various embodiments have been chosen to illustrate the invention, it will be understood by those skilled in the art that various changes and modifications can be made therein without departing from the scope of the invention as defined in the claims.

The invention claimed is:

1. A separating device for fluid media and receivable in a working housing to separate two media chambers in the working housing from one another, said separating device comprising:
    a separating piston having an outer circumference;
    a guide extending at least partially along said outer circumference adapted to rest slidingly against an inner wall of the working housing during a transversing movement of said separating piston in the working housing, said guide being an integral component of said separating piston; and
    a piston head on said separating piston forming a partition wall between the two media chambers of the working housing, said piston head having a curvature extending into an inside of said separating piston, said curvature forming a part of a spherical surface.

2. A separating device according to claim 1 wherein said guide comprises a guide ring formed directly on said separating piston.

3. A separating device according to claim 2 wherein said guide ring is formed on a first end region of said separating piston.

4. A separating device according to claim 3 wherein a circumferential annular groove is formed on a second end region of said separating piston and receives a piston seal ring, said first end region being opposite said second end region.

5. A separating device according to claim 2 wherein said guide ring forms a part of a guide surface forming part of a cylinder jacket interacting with a circular cylindrical inner wall of the working housing.

6. A separating device according to claim 1 wherein said piston head of said separating piston forms a hemispherical-shaped dome opening towards a side of said separating piston; and
ribs extend on an inside surface of said dome along circles of longitude to a center of a hemisphere of said dome from an equatorial plane defined by said opening of said dome.

7. A separating device according to claim 1 wherein said dome of said piston head comprises an outer surface extending at a region at a center of said dome to a height adjacent an end region of said separating piston.

8. A separating device according to claim 4 wherein plate-shaped reinforcement ribs extend in radial directions, are uniformly spaced from one another and connect said guide and said piston head of said separating piston.

9. A separating device according to claim 8 wherein said reinforcement ribs have outer end edges offset radially inward from said outer circumference of said separating piston in an axial region of said separating piston located between said guide ring and said circumferential annular groove.

10. A separating device according to claim 8 wherein said reinforcement ribs have outer end edges extending between said guide ring and said circumferential annular groove and extending inward with radial curves starting at said guide ring.

11. A separating device according to claim 8 wherein
said piston head of said separating piston forms a hemispherical-shaped dome opening towards a side of said separating piston; and
said reinforcement ribs have upper edges lying in a same plane as an upper outer surface of said dome and an end edge of said guide ring defining an end of said separating piston.

12. A separating device according to claim 11 wherein
said reinforcement ribs have outer end edges facing said circumferential annular groove and being adjacent to said upper outer surface of said dome at places axially offset relative to a facing wall of said circumferential annular groove.

13. A separating device for fluid media and receivable in a working housing to separate two media chambers in the working housing from one another, said separating device comprising:
a separating piston having an outer circumference and a piston head forming a partition wall between the two media chambers of the working housing;
a guide ring extending at least partially along said outer circumference adapted to rest slidingly against an inner wall of the working housing during a transversing movement of said separating piston in the working housing, said guide ring being an integral component of said separating piston at a first end region of said separating piston;
a circumferential annular groove formed in a second end region of said separating piston, said second end region being opposite said first end region;
plate-shaped reinforcement ribs extending in radial directions and connecting said guide ring and said piston head of said separating piston, said reinforcement ribs having outer end edges extending between said guide ring and circumferential annular groove and extending inward with radial curves starting at said guide ring.

14. A separating device for fluid media and receivable in a working housing to separate two media chambers in the working housing from one another, said separating device comprising:
a separating piston having an outer circumference and a piston head forming a partition wall between the two media chambers of the working housing, said piston head forming a hemispherical-shaped dome opening towards a side of said separating piston;
a guide ring extending at least partially along said outer circumference adapted to rest slidingly against an inner wall of the working housing during a transversing movement of said separating piston in the working housing, said guide ring being an integral component on said separating piston; and
plate-shaped reinforcement ribs extending in radial directions and connecting said guide ring and said piston head of said separating piston, said reinforcement ribs having upper edges lying in a same plane as an upper outer surface of said dome and an end edge of said guide ring defining an end of said separating piston.

15. A separating device for fluid media and receivable in a working housing to separate two media chambers in the working housing from one another, said separating device comprising:
a separating piston having an outer circumference and a piston head forming a partition wall between the two media chambers of the working hosing, said piston head forming a hemispherical-shaped dome opening towards a side of said separating piston;
a guide ring extending at least partially along said outer circumference adapted to rest slidingly against an inner wall of the working housing during a transversing movement of said separating piston in the working housing, said guide ring being an integral component of said separating piston at a first end region of said separating piston;
a circumferential annular groove formed in a second end region of said separating piston, said first end region being opposite said second end region; and
plate-shaped reinforcement ribs extending in radial directions and connecting said guide ring and said piston head of said separating piston, said reinforcement ribs having outer end edges facing said circumferential annular groove and being adjacent an upper outer surface of said dome at places axially offset relative to a facing wall of said circumferential annular groove.

* * * * *